D. L. LINDQUIST.
SYSTEM OF MOTOR CONTROL.
APPLICATION FILED AUG. 31, 1910.
1,066,741.
Patented July 8, 1913.
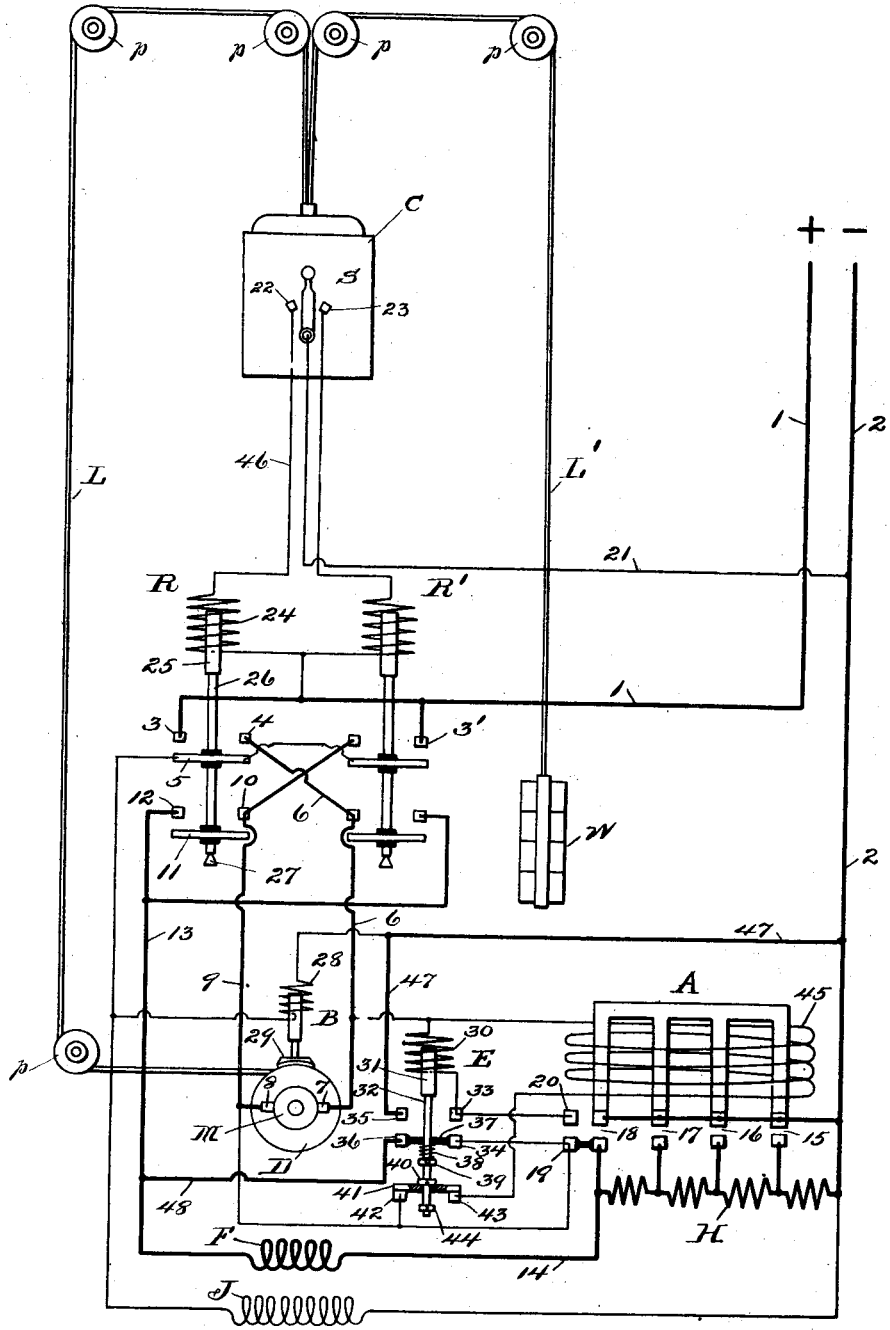

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

SYSTEM OF MOTOR CONTROL.

1,066,741.      Specification of Letters Patent.      Patented July 8, 1913.

Application filed August 31, 1910. Serial No. 579,873.

*To all whom it may concern:*

Be it known that I, DAVID L. LINDQUIST, a subject of the King of Sweden, residing at Yonkers, in the county of Westchester and State of New York, have invented a new and useful Improvement in Systems of Motor Control, of which the following is a specification.

My invention relates to a system of control for electric motors, and is particularly adapted to motors used for elevators or other hoisting apparatus.

One object of my invention is to prevent the motor from attaining an unsafe speed.

A further object is the prevention of reverse current in the motor field when the motor is being driven by the load.

Other objects will appear hereinafter, the novel combinations of elements being pointed out in the appended claims.

In the operation of elevators or hoists it is well known that a compound wound motor presents many advantageous features. Such a motor possesses the properties of heavy torque upon starting due to the combined action of the series and shunt fields, also a constant speed characteristic when excited by the shunt field alone. In this connection it is the usual practice to excite both fields upon starting and accelerating, after which the series field is short-circuited and the motor continues to run at normal full speed in either direction as a simple shunt motor. When the load drives the motor as a generator a reverse current will flow through the series field windings and the resultant field magnetism set up by this reverse current tends to weaken the total field strength by acting in opposition to the shunt field windings. For this reason the series fields are short-circuited after the motor has been started, and before any reverse current has commenced to flow. The short circuit thrown around the series field normally comprises a conductor of low resistance and two or more contacts for controlling said circuit. The ohmic resistance of this short-circuit connection is usually of an appreciable amount and may frequently approach that of the series field windings. Such being the case it is readily seen that even though the series fields are short-circuited a portion of the armature current will still flow through the series windings. In the case of a descending elevator car, when the same is heavily loaded, the motor is driven by the load and consequently acts as a generator, sending current back into the main line. If the series field carries any of this current it is readily seen that the series field is acting in opposition to the shunt field and the resultant action is a decrease in the field strength of the motor followed by increased speed, which may, under certain conditions reach a dangerous limit. With this understanding of conditions, I will now describe my invention which, as before pointed out, is for the purpose of overcoming this reverse current in the series field.

Referring to the drawing, C designates an elevator car suspended by cables L and L' which lead up over suitable guide pulleys $p$, $p$. The cable L' is connected to a counterbalance weight while the cable L is wound about a winding drum D which is arranged to be driven by the motor M.

B designates a friction brake apparatus which is normally applied to hold the drum against rotation but is released by a magnet 28 when the motor is supplied with current to raise or lower the elevator car.

F designates the series field winding, while J is the shunt field winding.

H is the starting resistance and is controlled by the accelerating magnet A.

R and R' designate motor starting and reversing switches. These switches are similar in construction and each comprises a magnet winding such as 24 which is adapted when energized to raise a core 25 and rod 26. A pair of contact disks 5 and 11 are carried by the rod 26 but insulated therefrom. These contact disks are adapted when in their raised position to bridge or electrically connect the fixed contacts 3, 4 and 12, 10, respectively.

27 designates a stop for limiting the downward movement of the rod 26 and its connected parts. The reversing switches may be controlled in any desired manner, for example, by means of a hand switch S in the elevator car.

E designates an electrically operated switch which controls the series field of the motor and the circuit of the accelerating magnet A. This switch comprises a magnet winding 30 which is adapted when energized to raise a core 31 and connected rod 32. An insulated piece 37 is slidably mounted upon the rod and carries contacts 36 and 34 on either end. Directly above these contacts and in vertical alinement therewith are arranged fixed contacts 35 and 33 respectively. The insulated piece 37 rests upon a spring 38 which is supported by a collar 39 securely fastened to the rod 32. A contact disk 41 shown in part section is also slidably mounted upon the rod 32 and normally rests upon, and electrically connects, a pair of fixed contacts 42, 43. A collar 40 is secured upon the rod 32 and serves to support the weight of the switch parts by bearing against the contact disk 41. An additional collar 44 is secured to the rod 32 at a predetermined distance from the contact disk 41. The switch E is preferably constructed as just described in order that the circuits controlled by the contacts 33, 34, 35 and 36 may be established before the contact disk 41 is raised out of engagement with the contacts 42 and 43. The reason for this will be pointed out later on.

I will now describe the operation of the system as a whole.

Assuming the mains 1 and 2 are connected to a suitable source of electrical supply designated by the usual characters + and −, the controlling lever of the hand switch S is moved to the left until it engages the switch contact 22. A circuit is thereby established to the magnet winding 24 of reversing switch R and may be traced from the main 1, winding 24, wire 46, switch S, and by wire 21 to the main 2. The magnet winding 24 is now energized and will raise its core 25 and connected contacts and close a circuit to the motor and brake B. The motor circuit may be traced from the main 1, contact 3, contact plate 5, contact 4, wire 6, armature brush 7, through the armature of the motor to brush 8, wire 9, contact 10, contact disk 11, contact 12, wire 13, through the series field F, wire 14, through the starting resistance H to the main 2. At the same time a circuit is completed to the shunt field J and the brake releasing magnet 8 across the mains, said circuit including the contact 3 and contact disk 5. The motor now receives current limited by the starting resistance H and starts to rotate at slow speed. The winding 45 of the accelerating magnet A is connected across the motor armature, its circuit including the normally closed lower contacts 42 and 43, of the switch E. The accelerating magnet is therefore dependent for its operation upon the varying counter-electro-motive-force of the motor and will operate its resistance controlling contacts 15, 16, 17 and 18 in successive order to gradually short circuit the starting resistance and bring the motor up to speed. These contacts may be arranged at varying distances from the magnet as shown, so that they will operate one after the other in a well known way. As the contacts 18 close, the contacts 19 and 20 will also close thereby connecting the magnet winding 30 of switch E in parallel with the accelerating magnet and across the motor armature. The core 31 will now be raised upwardly carrying with it the contacts 36 and 34, the contact disk 41 remaining in engagement with the contacts 42 and 43 as the rod 32 moves freely through the disk. The contacts 36 and 34 first make contact with the fixed contacts 35 and 33 respectively, and as the rod 32 continues to move upwardly the spring 38 is compressed and the collar 44 engages the disk 41 and moves it out of electrical engagement with the contacts 42 and 43. The closing of the contacts 35 and 36 establishes a short or parallel circuit around the starting resistance and series field by way of the conductors 47 and 48, and the motor will now run at constant speed as a simple shunt wound motor. It will be seen that the contacts 33 and 34 are connected in parallel to the contacts 20 and 19, hence, when the contact disk 41 is raised upwardly, to interrupt the circuit of the accelerating magnet winding 45 at the contacts 42 and 43, and this winding becomes deënergized and allows all of its contacts to drop back to original open position, the circuit of the magnet 30 is not interrupted at the contacts 30 and 19 since a parallel circuit to the winding was established at the contacts 33, 34. The magnet switch E is therefore self-holding. As the accelerating magnet is deënergized and drops its contacts 15, 16, 17, 18 and 19, the starting resistance is again connected in series with the series field of the motor. The re-insertion of the starting resistance in series with the series field winding of the motor at about the time the latter has been brought up to speed constitutes an important part of my invention, since, as before pointed out, it operates to increase the ohmic resistance of the circuit including the series field which circuit is paralleled by a short circuit of extremely low resistance compared with the resistance of the series field and the starting resistance and therefore practically all of the current flowing to or from the motor will seek the path of lowest resistance which in the present instance comprises the conductors 47, 48 and the contacts 35, 36. Heretofore it has been customary to maintain the short-circuit around the starting resistance by keeping the accelerating magnet energized and in this manner lowering the resistance of the circuit including the series field to such an amount that a considerable current found its way therethrough. My invention increases the resistance of this circuit to such an extent that very little or practically no current will pass through the series field when the motor is operating as a shunt machine and in case the load drives the motor as a generator any reverse current in the series field will be so very minute that it will have practically no tendency whatever to oppose the shunt field and the field strength and speed of the motor remains constant thereby obviating all danger of a runaway caused by a weak motor field.

In order to stop the motor, the lever of switch S is moved to its neutral position whereupon the circuit of the reversing switch R is interrupted at the contact 22 and the motor, assisted by the brake B comes to rest and all parts resume their normal inactive positions. In order to effect the operation of the motor in a reverse direction, the lever of switch S is moved toward the right onto contact 23, thereby energizing the magnet winding of the reversing switch R′ and causing the same to close the motor and brake circuits. In this instance the motor will rotate in a reverse direction, since by following out the circuits it will be seen that the armature circuit is now reversed while the field circuits remain as before.

I desire not to be limited to the precise construction and arrangement of parts herein shown and described, since it is obvious that various changes could readily be made by one skilled in the art without departing from the spirit and scope of my invention.

What I claim as new and desire to have protected by Letters Patent of the United States is:—

1. The combination of a compound wound electric motor, starting resistance therefor in series with the series field winding, an accelerating magnet operable to short circuit the starting resistance, an electromagnetic relay, a switch operated by the accelerating magnet to establish a circuit through the magnet coil of said relay, a switch operated by said relay to establish a circuit in parallel with the starting resistance and series field winding and a second switch operated by said relay to open the circuit of the accelerating magnet winding.

2. The combination of a compound wound electric motor, a starting resistance therefor, an accelerating magnet arranged to short circuit the starting resistance during the acceleration of the motor, an electromagnet, a switch in circuit with the winding of said electromagnet and closed by the accelerating magnet when the starting resistance is short-circuited, a low resistance circuit in shunt to the starting resistance and series field winding of the motor, a switch in said shunt circuit operated to closed position by said electromagnet when the latter is energized, a second switch operated by said electromagnet to open position when the electromagnet is energized, and a circuit for the accelerating magnet coil including said last named switch.

In testimony whereof, I have signed my name to this specification in the presence of two subscribing witnesses.

DAVID L. LINDQUIST.

Witnesses:
FRED O. DUTTON,
GEORGE D. ROSE.